A. N. GANDY.
NUT LOCK.
APPLICATION FILED SEPT. 7, 1911.

1,019,243.

Patented Mar. 5, 1912.

Inventor
A. N. Gandy.

Witnesses

By

Attorneys

UNITED STATES PATENT OFFICE.

ARTHUR NEWELL GANDY, OF BRUNDIDGE, ALABAMA.

NUT-LOCK.

1,019,243.  Specification of Letters Patent.  Patented Mar. 5, 1912.

Application filed September 7, 1911. Serial No. 648,202.

*To all whom it may concern:*

Be it known that I, ARTHUR N. GANDY, a citizen of the United States, residing at Brundidge, in the county of Pike, State of Alabama, have invented certain new and useful Improvements in Nut-Locks; and I do hereby declare the following to be a full, clear, and exact description of the invention, such as will enable others skilled in the art to which it appertains to make and use the same.

This invention relates to nut locks.

The object of the invention resides in the provision of a nut lock which will effectually prevent the rotation of a nut upon a bolt after the former has been applied to the latter, as the result of jarring or other causes.

A further object of the invention resides in the provision of a nut lock which can be manipulated with ease and facility so as to permit the disengagement of a nut from a bolt when so desired.

A still further object of the invention resides in the provision of a nut lock which will be simple in construction, efficient in use and easily applied.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1:
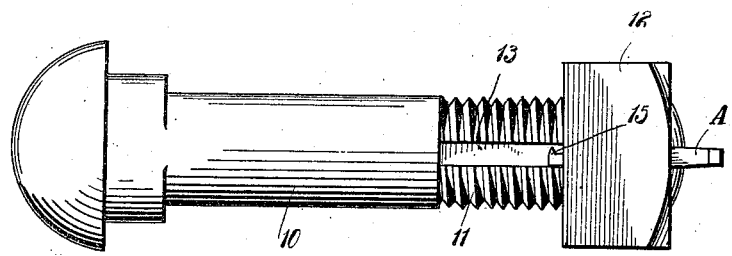
Figure 2:
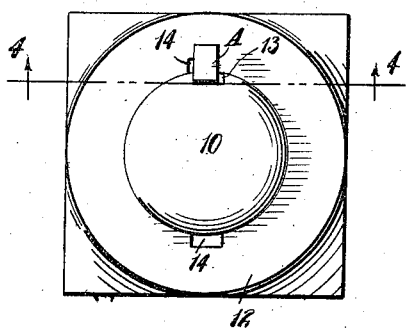
Figure 5:
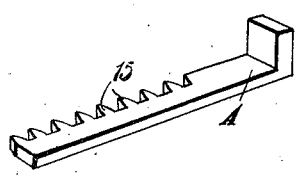

Figure 1 is a side elevation of an associated bolt and nut embodying the improved nut lock. Fig. 2, an enlarged view looking at the end of the bolt which carries the nut, the latter being shown in locking position with respect to the locking pin, Fig. 3, a view similar to Fig. 2 with the nut disposed in released position with respect to the locking key and the latter removed, Fig. 4, a section on the line 4—4 of Fig. 2, and Fig. 5, a detail perspective view of the locking key.

Figure 3:
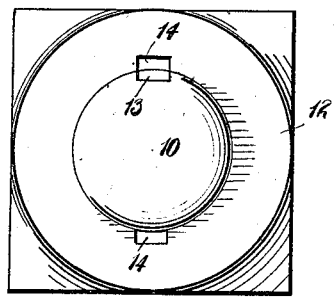
Figure 4:
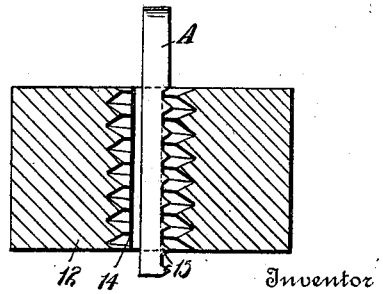
Figure 4:

Referring to the drawings, 10 indicates a bolt provided with the usual threads 11 upon which latter is mounted a nut 12. The threads 11 of the bolt 10 are interrupted by a longitudinal groove 13, while the threads of the nut 12 are interrupted by a plurality of longitudinal grooves 14 which are adapted to respectively mate with the groove 13 dependent upon the position of the nut 12 when the latter has been screwed home the desired distance. Inserted in the mating grooves 13 and 14 is a locking key A which is of less width than said grooves and has one edge provided with teeth 15. When the grooves 13 and 14 are in full mating position as shown in Fig. 3 the locking key A may be readily inserted and withdrawn from said groove. However, if after the locking key A has been inserted in the grooves 13 and 14 and the nut 12 is rotated to the left a distance equal to the difference in width between the grooves 13 and 14 and the locking key A, the teeth 15 of said locking key will enter between the threads of the nuts 12 and the withdrawal of said key will thereby be rendered impossible and the nut thus secured against rotation in an unlocking direction by the engagement of opposite sides of the locking key with respective opposite side walls of the grooves 13 and 14.

What is claimed is:

In a nut lock the combination of a bolt having its threads interrupted by a longitudinal groove, a nut on said bolt also having its threads interrupted by a longitudinal groove overlying the groove in the bolt, a locking key disposed in said grooves and of less width than the latter, and a plurality of teeth formed on one edge of the locking key adapted to pass between the threads of the nut respectively when the latter is rotated in one direction.

In testimony whereof, I affix my signature, in presence of two witnesses.

ARTHUR NEWELL GANDY.

Witnesses:
 D. H. LAMSON,
 J. B. BLANTON.